United States Patent
Le Grand

(10) Patent No.: US 7,689,541 B1
(45) Date of Patent: *Mar. 30, 2010

(54) REORDERING DATA USING A SERIES OF OFFSETS

(75) Inventor: Scott M. Le Grand, Soquel, CA (US)

(73) Assignee: NVIDIA Corporation, Santa Clara, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 11/836,415

(22) Filed: Aug. 9, 2007

(51) Int. Cl.
G06F 7/00 (2006.01)
(52) U.S. Cl. .............................. 707/2; 707/7
(58) Field of Classification Search ............. 707/2, 707/7, 6; 711/216; 345/501; 718/105
See application file for complete search history.

(56) References Cited

U.S. PATENT DOCUMENTS

| | | | |
|---|---|---|---|
| 5,434,995 A | 7/1995 | Oberlin et al. | |
| 5,721,921 A | 2/1998 | Kessler et al. | |
| 5,924,091 A * | 7/1999 | Burkhard | 707/7 |
| 5,928,351 A | 7/1999 | Horie et al. | |
| 6,085,303 A | 7/2000 | Thorson et al. | |
| 6,216,174 B1 | 4/2001 | Scott et al. | |
| 6,292,822 B1 * | 9/2001 | Hardwick | 718/105 |
| 6,519,593 B1 * | 2/2003 | Matias et al. | 707/7 |
| 6,897,871 B1 | 5/2005 | Morein et al. | |
| 7,424,467 B2 * | 9/2008 | Fontoura et al. | 707/2 |
| 2005/0165838 A1 * | 7/2005 | Fontoura et al. | 707/104.1 |
| 2007/0106876 A1 * | 5/2007 | Goswami | 711/216 |
| 2007/0271268 A1 * | 11/2007 | Fontoura et al. | 707/6 |
| 2008/0316214 A1 * | 12/2008 | Peeper | 345/501 |

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Massively Parallel Computing with Cuda, Hendrik Lensch, synchronization and sorting.*

(Continued)

*Primary Examiner*—Hung T Vy
(74) *Attorney, Agent, or Firm*—Patterson & Sheridan, LLP

(57) ABSTRACT

One embodiment of the present invention sets forth a technique for efficiently performing a radix sort operation on a graphics processing unit (GPU). The radix sort operation is conducted on an input list of data using one or more passes of a series of three processing phases. In each processing phase, thread groups are each associated with one segment of input data. In the first phase, occurrences of each radix symbol are counted and stored in a list of counters. In the second phase, the list of counters is processed by a parallel prefix sum operation to generate a list of offsets. In the third phase, the list of offsets is used to perform re-ordering on the list of data, according to the current radix symbol. To maintain sort stability, the one or more passes proceed from least significant data to most significant data in the sort key.

20 Claims, 15 Drawing Sheets

OTHER PUBLICATIONS

Mars: a Mapreduce Framework on Graphic Processor, Naga. K. Govindaraju.*

Eggers, et al. "Simultaneous Multithreading: A Platform for Next-Generation Processors", IEEE Micro. Sep./Oct. 1997 (vol. 17, No. 5) pp. 12-19.

Johnson, et al. "A Distributed Hardware Mechanism for Process Synchronization on Shared-Bus Multiprocessor," 1994. IEE Computer Society; ICPP '94. pp. 268-275.

Eggers, et al., "Simultaneous Multithreading: A Platform for Next-Generation Processors," *IEEE Micro*, vol. 17, No. 5, pp. 12-19, Sep./Oct. 1997.

* cited by examiner

REORDERING DATA USING A SERIES OF OFFSETS

BACKGROUND OF THE INVENTION

1. Field of the Invention

Embodiments of the present invention relate generally to parallel processing and more specifically to a radix sort algorithm for graphics processing units.

2. Description of the Related Art

A typical computer system includes, without limitation, a central processing unit (CPU), a parallel processing subsystem, such as a graphics processing unit (GPU), a display device, and one or more input devices. The user may interact with a software application executing within the computer system by operating at least one input device and observing the results on the display device. The CPU typically executes the overall structure of the software application and configures the GPU to perform specific tasks. In current technology, the CPU tends to offer more general functionality using a relatively small number of large execution threads, while the GPU is capable of very high performance using a relatively large number of small, parallel execution threads on dedicated hardware processing units.

A typical software application may include certain operations designed to execute on the CPU, while other operations execute on the GPU. For example, the CPU may be configured to run the graphical user interface (GUI) for the application and perform certain application-specific logic, whereas the GPU may be configured to perform computationally intensive tasks, such as rendering graphics images. Software applications typically execute as much computation work on the GPU as possible to improve overall system performance. However, certain common operations are not easily or efficiently mapped to the parallel architecture of the GPU. When the application performs an operation that does not have an efficient mapping to the parallel architecture of the GPU, a "work-inefficient" processing step is commonly needed, wherein the GPU processes related data with relatively low overall processor utilization for the duration of the processing step. Alternately, the CPU may perform the processing step instead of the GPU. In both cases, the overall application performance may suffer.

As is well known, sorting lists of data is one common processing operation used in a wide range of applications. However, many conventional sorting algorithms tend to be predominantly serial in execution, making these algorithms less efficient at exploiting the parallel GPU architecture. In general, therefore, sorting is performed by the CPU rather then the GPU, even when the sort input data is generated by the GPU. For GPU-based applications, waiting for the CPU to perform a sort operation can introduce inefficiency and significantly reduce overall application performance.

As the foregoing illustrates, what is needed in the art is a technique for performing efficient sort operations on a GPU.

SUMMARY OF THE INVENTION

One embodiment of the invention sets forth a method for performing a radix sort operation. The method includes the steps of (1) associating a first thread group with a first set of sort keys and a second thread group with a second set of sort keys, where each thread in the first thread group corresponds to a different one of the sort keys in the first set of sort keys, and each thread in the second thread group corresponds to a different one of the sort keys in the second set of sort keys, and where each sort key comprises an identical number of sub-keys; (2) selecting a first sub-key for each thread in the first thread group and for each thread in the second thread group; (3) determining a value for the first sub-key for each thread in the first thread group; (4) tabulating a first number of occurrences of each radix symbol in a plurality of radix symbols based on the values of the first sub-key determined for the threads in the first thread group, where each radix symbol corresponds to a different sub-key value; (5) determining a value for the first sub-key for each thread in the second thread group; (6) tabulating a second number of occurrences of each radix symbol in the plurality of radix symbols based on the values of the first sub-key determined for the threads in the second thread group; (7) performing a prefix sum operation across each radix symbol and the first number of occurrences of the radix symbol and the second number of occurrences of the radix symbol to produce a first prefix sum output list; (8) modifying the first prefix sum output list to produce a first set of prefix sum offsets; and (9) reordering data associated with the sort keys based on the first set of prefix sum offsets to produce a first set of reordered data.

One advantage of the disclosed method is that it enables a radix sort algorithm to be executed using a parallel processing architecture, thereby resulting in overall performance improvements relative to prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
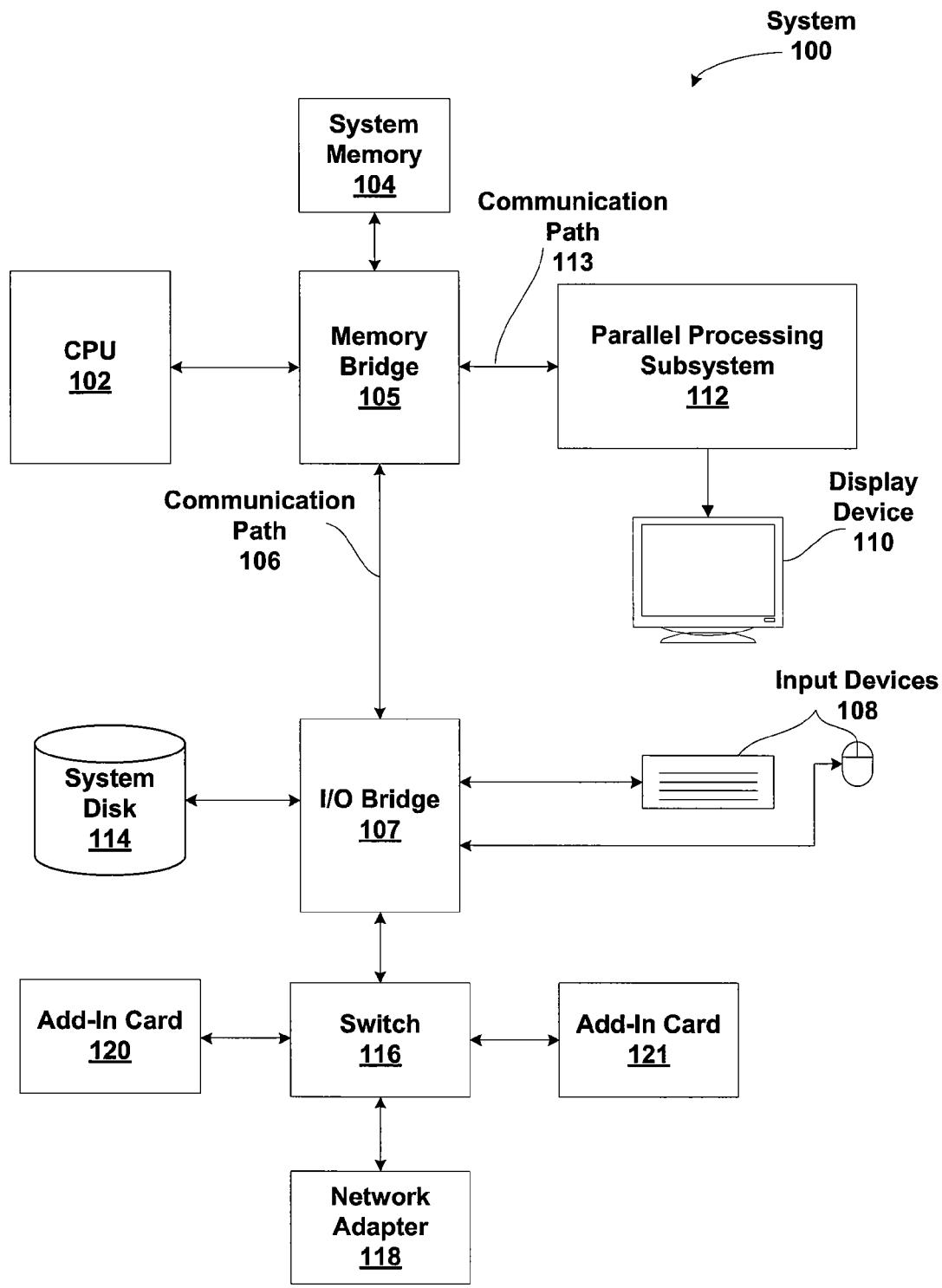
FIG. 1 is a block diagram illustrating a computer system configured to implement one or more aspects of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
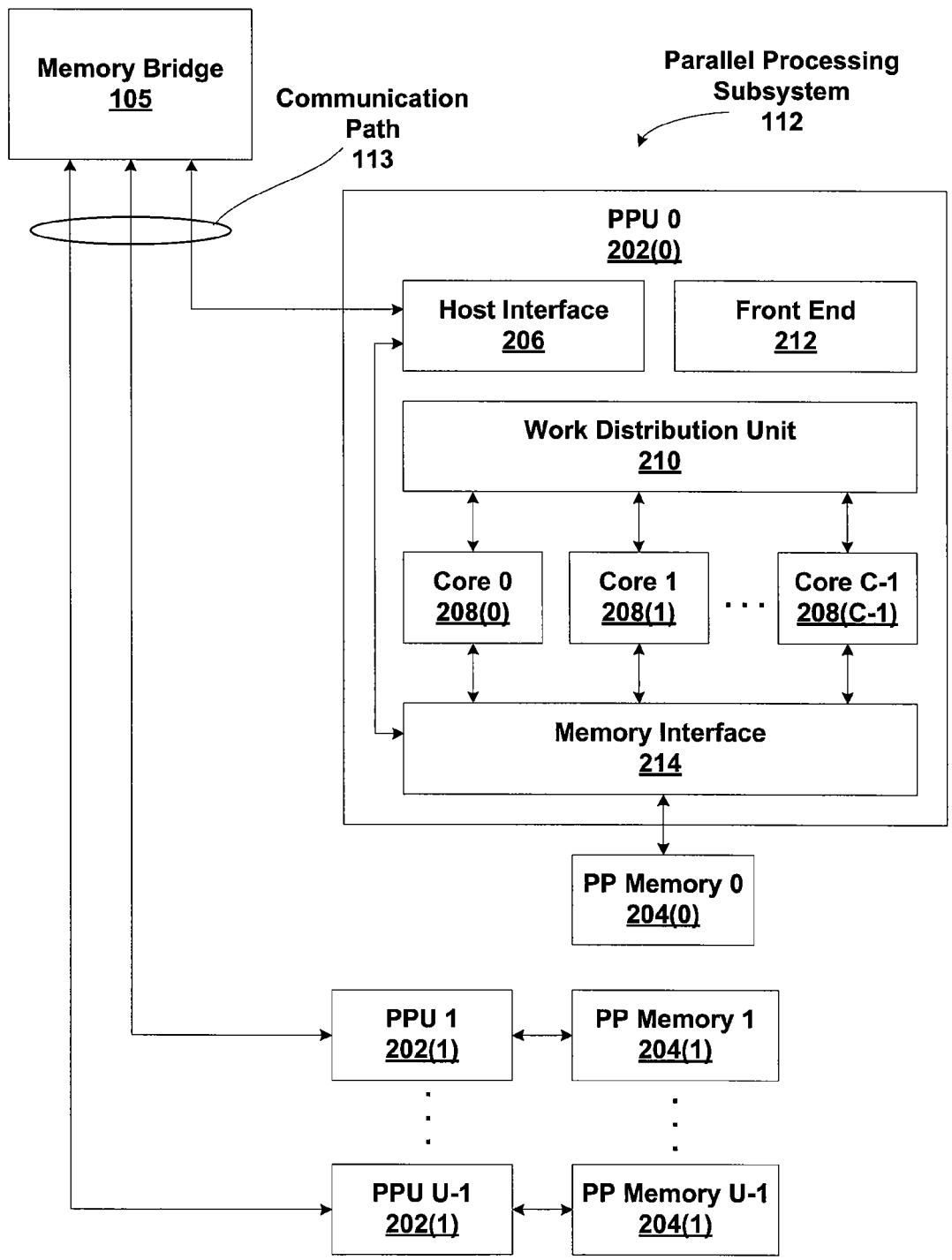
FIG. 2 illustrates a parallel processing subsystem, according to one embodiment of the invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
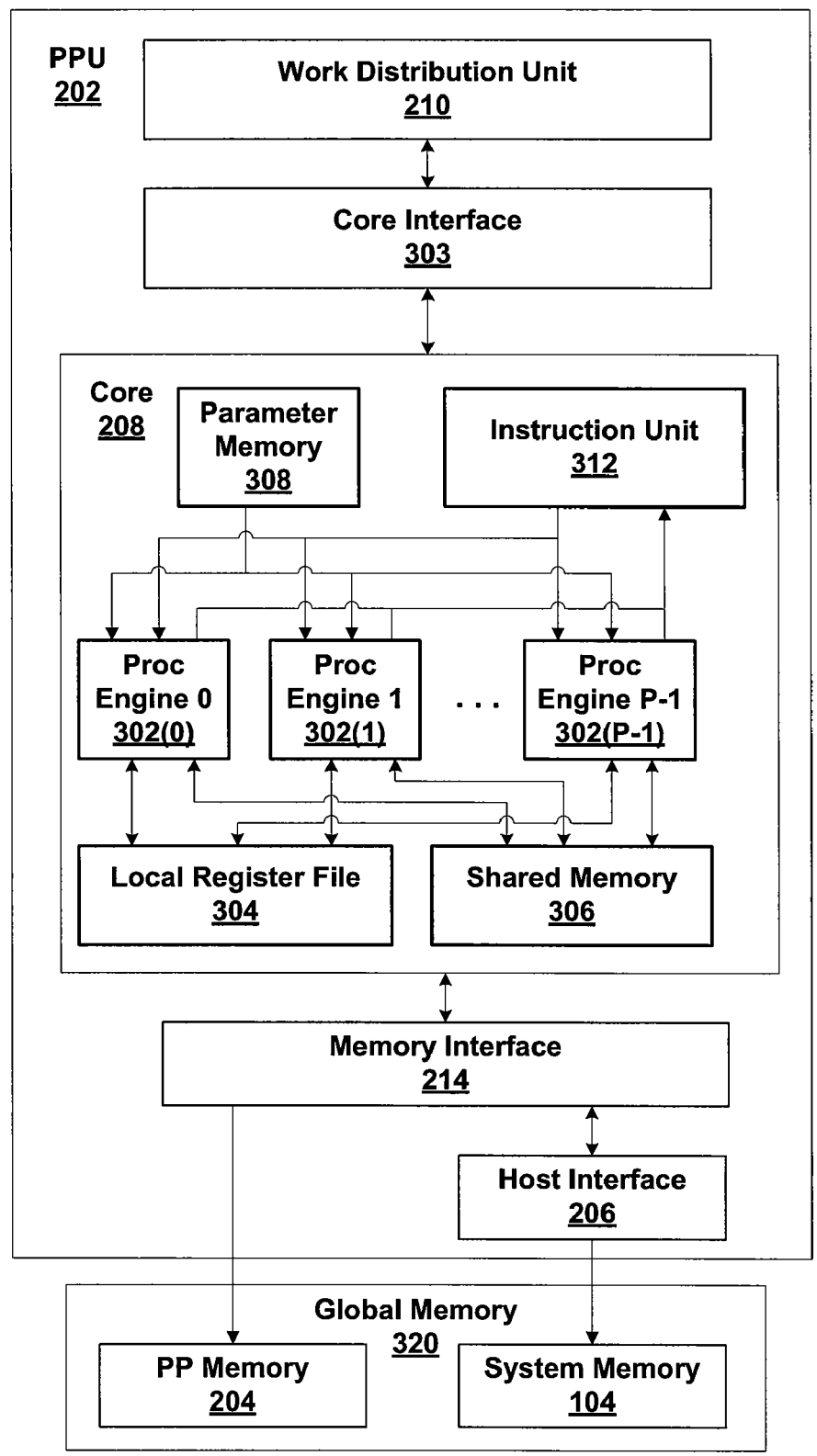
FIG. 3 is a block diagram of a parallel processing unit for the parallel processing subsystem of FIG. 2, in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

As is well known, a SIMD core 208 executes a single instruction on different data across a plurality of parallel processing engines 302 included in the core 208. Thus, for example, the core 208 is configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "thread group." Additionally, a plurality of thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is also an integer multiple of the number of parallel processing engines 302 in a core 208, and m is the number of thread groups simultaneously active on the core 208. The size of a CTA is generally determined by the amount of hardware resources, such as memory or registers, available to the CTA.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD thread groups." As used herein, a "SIMD thread group" refers to a group of up to P threads of execution of the same program on different input data, with one thread of the group being assigned to each processing engine 302. A SIMD thread group may include fewer than P threads, in which case some of processing engines 302 will be idle during cycles when that SIMD thread group is being processed. A SIMD thread group may also include more than P threads, in which case processing will take place over consecutive clock cycles. Since each processing engine 302 can support up to G threads concurrently, it follows that up to G SIMD thread groups can be executing in core 208 at any given time.

On each clock cycle, one instruction is issued to all P threads making up a selected one of the G SIMD thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD thread group in instruction unit 312, then signals instruction unit 312 to begin executing the threads. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Groups and Cooperative Thread Arrays

In some embodiments, multithreaded processing core 208 of FIG. 3 can execute general-purpose computations using thread groups. As described previously, a thread group consists of a number (n0) of threads that concurrently execute the same program on an input data set to produce an output data set. Each thread in the thread group is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread groups are arranged as "cooperative thread arrays," or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread groups) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions of an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a push-buffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the push buffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Radix Sort Algorithm for Graphics Processing Units

Figure 4A:
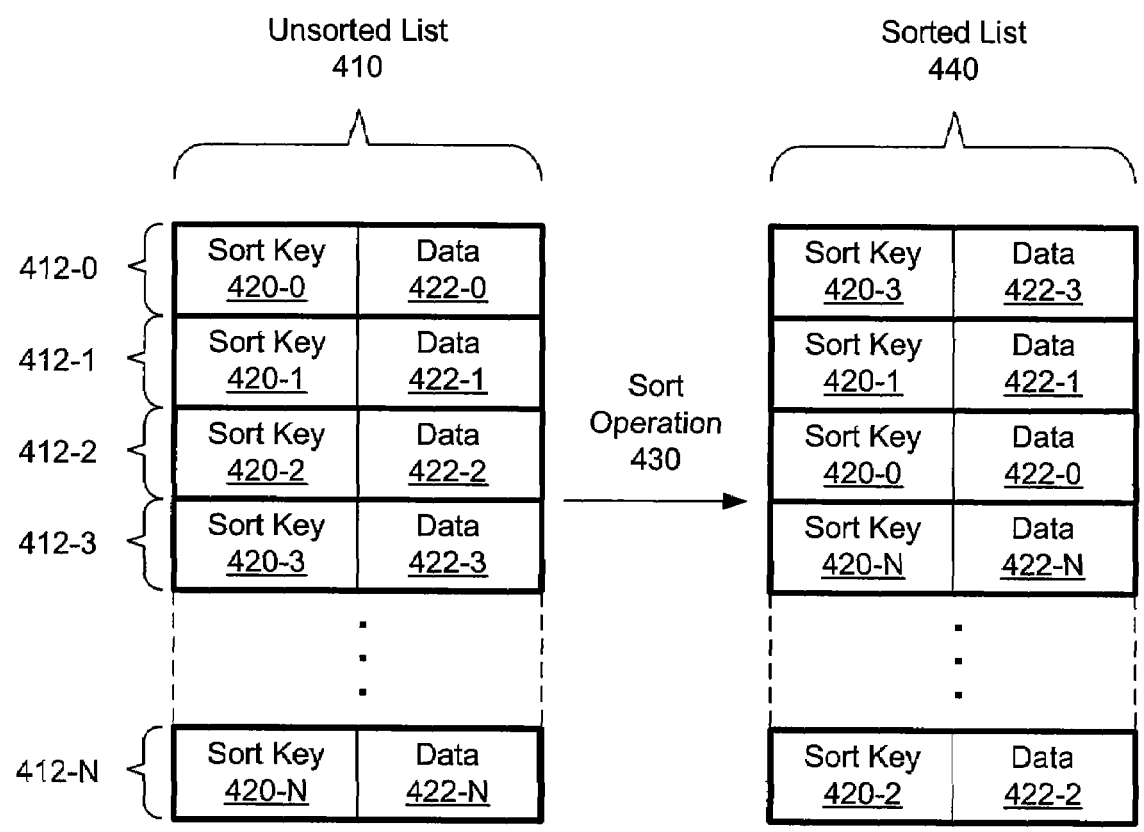
FIG. 4A illustrates a sort operation, in accordance with one or more aspects of the present invention.

FIG. 4A illustrates a sort operation 430, in accordance with one or more aspects of the present invention. An unsorted list 410 is processed by the sort operation 430 to generate a sorted list 440. The unsorted list 410 includes one or more entries 412. Each entry 412 includes a sort key 420 and may include data 422. The sorted list 440 includes a potentially reordered set of the same entries 412 from the unsorted list 410. Reordering to perform a sort operation may be based on any specified ordered relationship of sort keys 420. For example, the entries 412 may be reordered to sort the associated sort keys 420 based on a sort rule such as ascending numerical value or ascending alphabetic order. Persons skilled in the art will recognize that any application or function configured to generate the unsorted list 410 may also be configured to generate sort keys for the various entries in that list.

In the unsorted list 410, entry 412-3 includes sort key 420-3 and data 422-3. If the sort key 420-3 should be the first in the sorted list 440, based on a sort rule applied to all sort keys 420, then the sort operation 430 places entry 420-3 as the first entry in the sorted list 440. This process continues until all entries have been reordered within the sorted list 440 according to the sort operation 430.

Figure 4B:
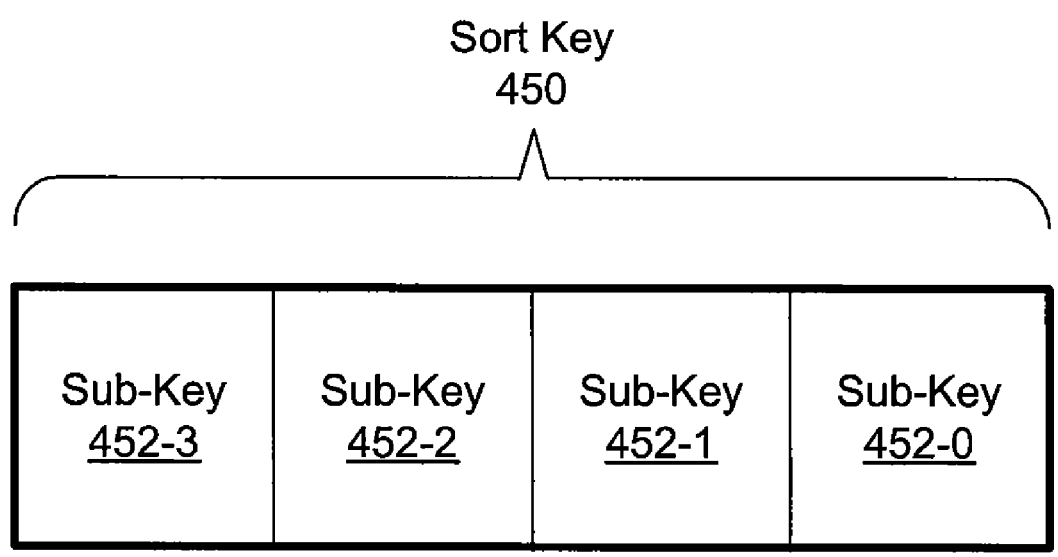
FIG. 4B illustrates a sort key, including one or more sub-keys, in accordance with one or more aspects of the present invention.

FIG. 4B illustrates a sort key 450, including one or more sub-keys 452, in accordance with one or more aspects of the present invention. The sort key 450 may be any sequence of data, such as an integer or a list of characters. The sub-keys 452 are portions, or ranges, of the sort key 450. For example, if sort key 450 is a 32-bit integer, then sub-keys 452 may be 8-bit integers. Furthermore, sub-key 452-0 may be the least significant 8 bits of sort key 450 and sub-key 452-3 may be the most significant 8 bits of sort key 450. In the context of performing a radix sort, a radix symbol is one of a finite set of unique codes associated with a sub-key. For example, if a sub-key is four bits long, then sixteen total radix symbols are possible within a sub-key. If the radix symbols are represented using a hexadecimal format, then the sixteen radix symbols are 0x0 through 0xF. With an 8-bit sub-key, 256 (2^8) radix symbols are possible. Again, using hexadecimal, the radix symbols include 0x00 through 0xFF.

Figure 5A:
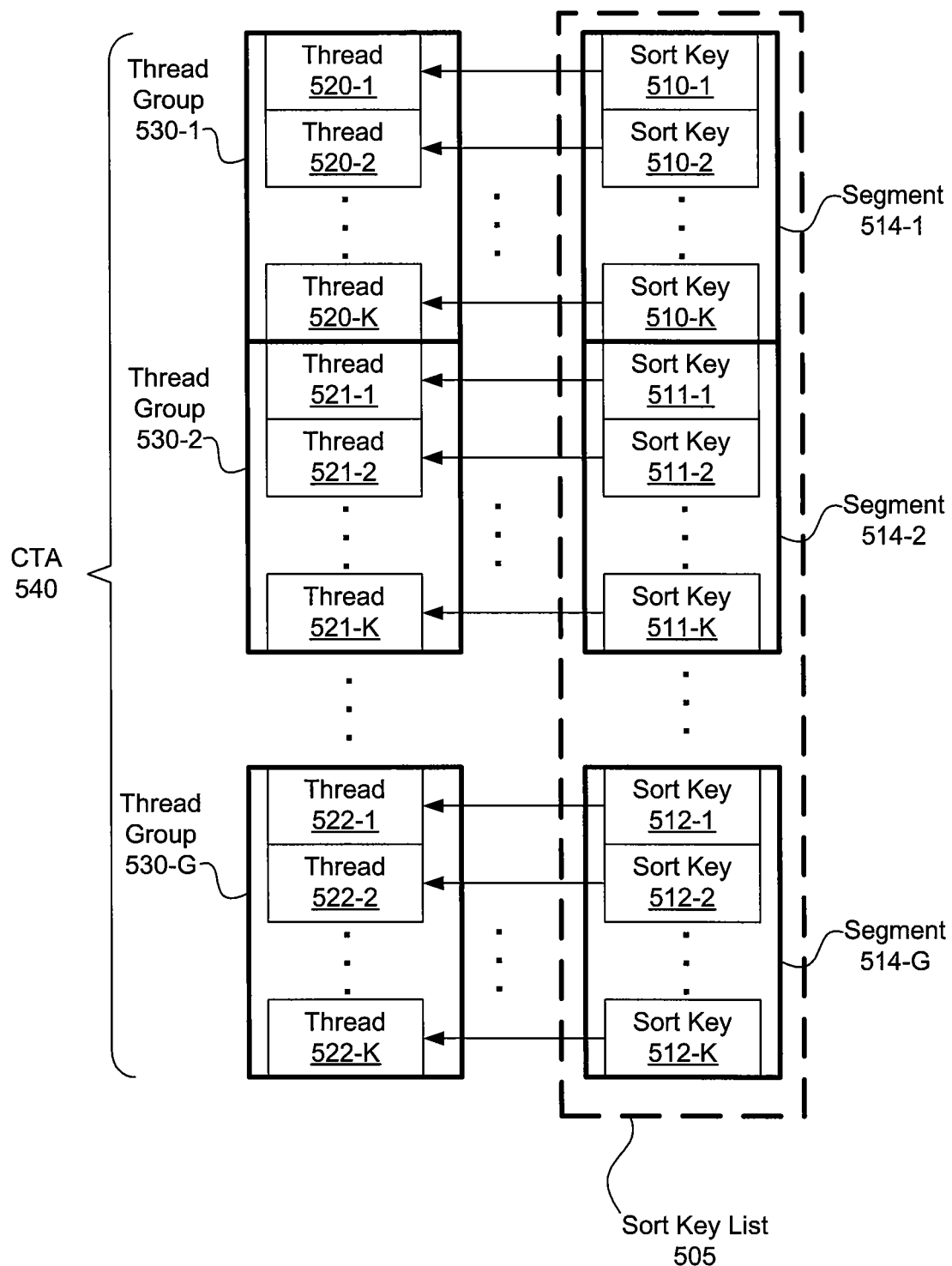
FIG. 5A illustrates a set of thread groups configured to process sort keys from a sort key list, according to one embodiment of the invention.

FIG. 5A illustrates a set of thread groups 530 configured to process sort keys 510 from a sort key list 505, according to one embodiment of the invention. A cooperative thread array (CTA) 540 includes thread groups 530-1 through 530-G. In one embodiment G is 12, and CTA 540 includes 12 thread groups. Each thread group 530 includes one or more threads. For example, thread group 530-1 includes threads 520-1 through 520-K. In one embodiment K is 16, and each of the thread groups 530 includes 16 threads. The sort key list 505 includes segments 514. Each segment 514 is associated with a different thread group 530. Each segment 514 includes one or more sort keys 512 and may include data associated with the sort keys. Each sort key 510, 511, 512 is associated with a different thread in an associated thread group 530. For example, segment 514-1 is associated with thread group 530-1 within CTA 540. As a result of this association, sort key 510-1 is associated with thread 520-1 within thread group 530-1.

Thread 520-1 may process the sort key 510-1 or a sub-key of the sort key 510-1. For example, in a first pass, thread 520-1 may operate on a sub-key formed by the lower 8 bits of sort key 510-1. In a second pass, thread 520-1 may operate on a sub-key formed by next higher 8 bits of sort key 510-1, and so on.

Figure 5B:
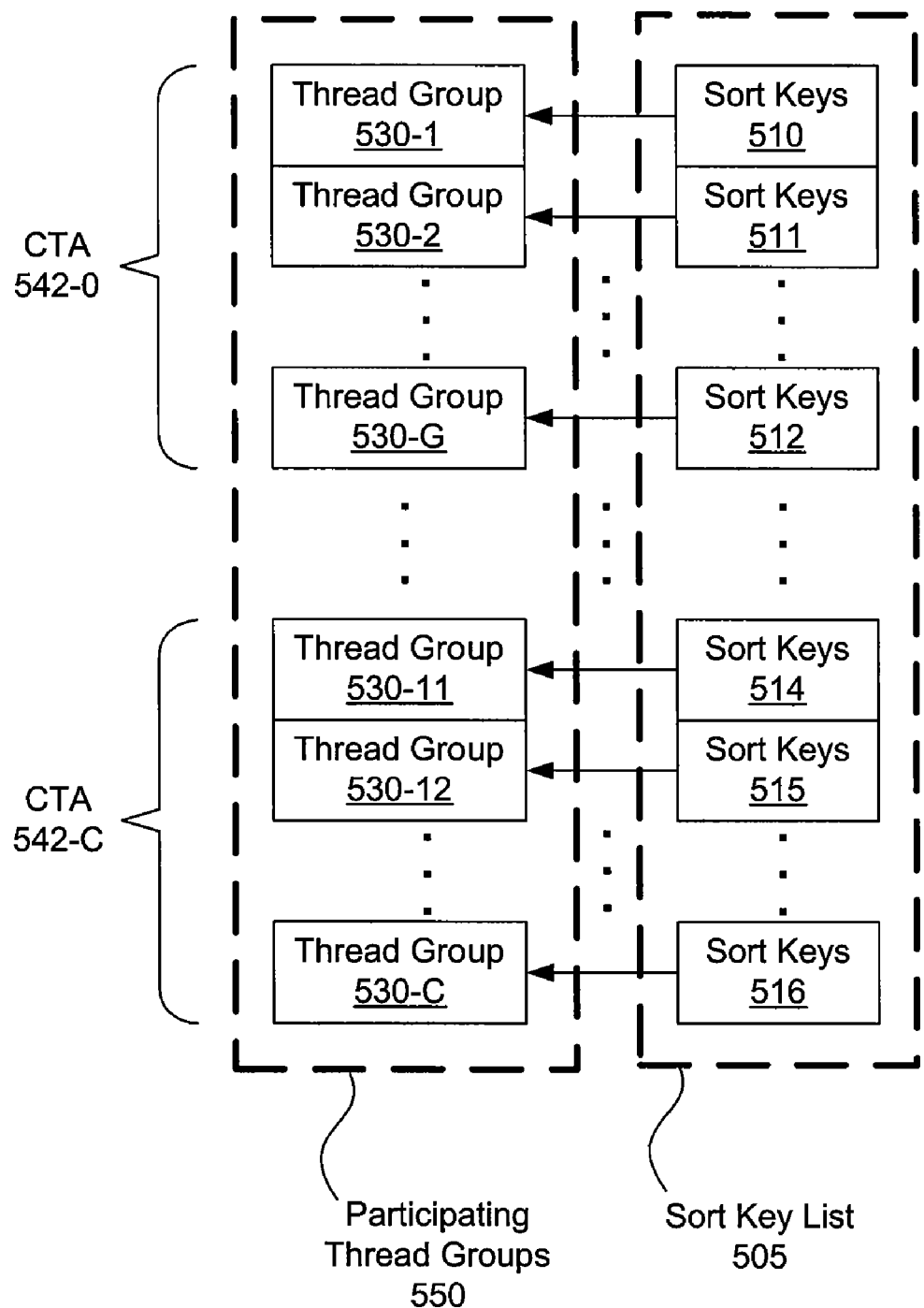
FIG. 5B illustrates a set of cooperative thread arrays (CTAs) configured to process sort keys from a sort key list, according to one embodiment of the invention.

FIG. 5B illustrates a set of cooperative thread arrays (CTAs) 542 configured to process sort keys 510-516 from a sort key list 505, according to one embodiment of the invention. Each CTA 542 includes thread groups 530, which collectively form a set of participating thread groups 550. Persons skilled in the art will recognize that synchronization may be required to coordinate the activities of the CTAs 542 as they process the sort key list 505. This synchronization may be performed using any technically feasible technique. One such technique is described in patent application titled, "A Method for Synchronizing Independent Cooperative Thread Arrays Running on a Graphics Processing Unit," filed on Aug. 8, 2007 and having U.S. patent application Ser. No. 11/836,017.

Figure 6A:
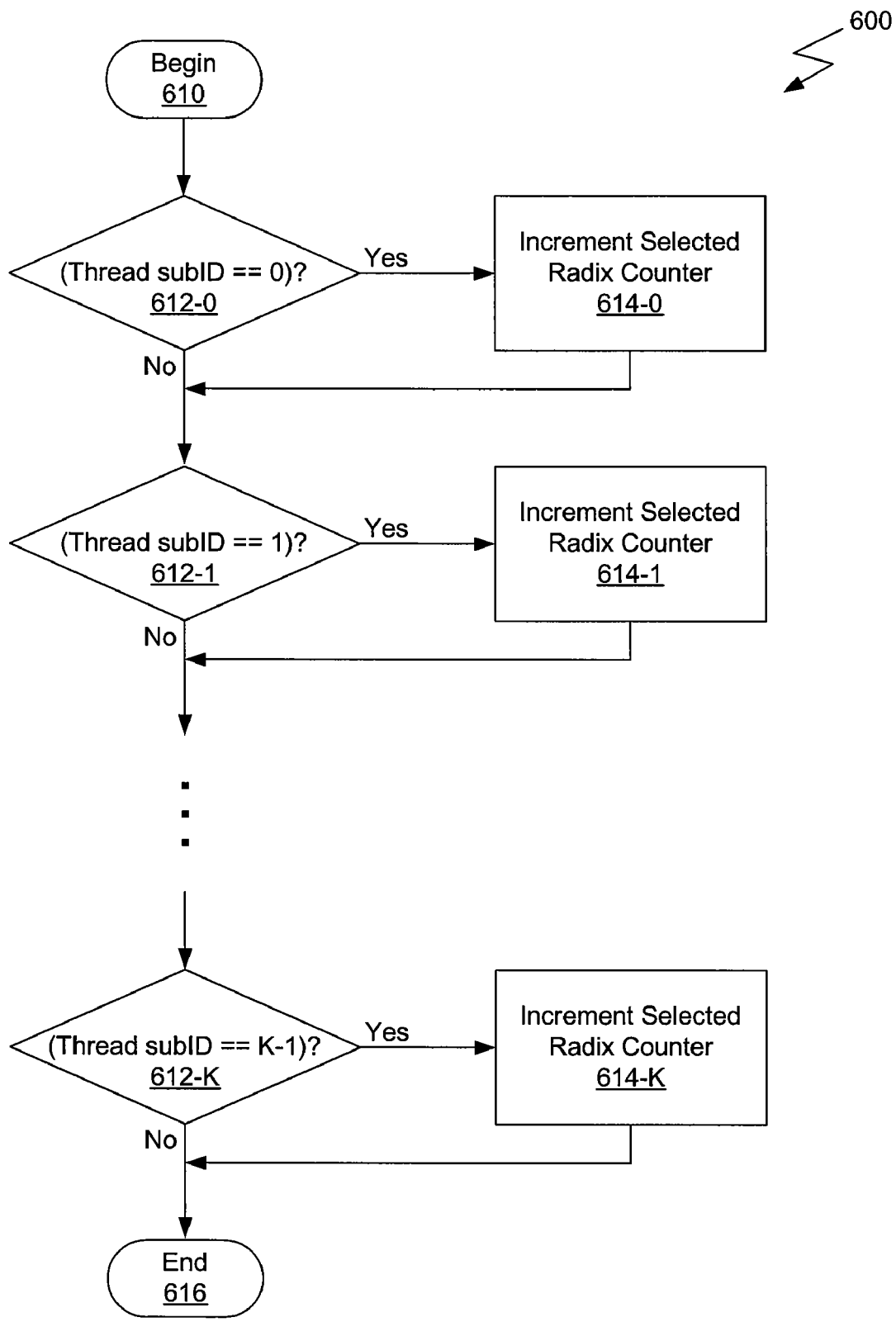
FIG. 6A is a flow diagram of method steps for counting the occurrence of radix symbols within a segment of a sort key list, according to one embodiment of the invention.

FIG. 6A is a flow diagram of method steps 600 for counting the occurrence of radix symbols within a segment of a sort key list, according to one embodiment of the invention. Although the method steps are described in conjunction with the systems of FIGS. 1, 2 and 3, persons skilled in the art will understand that any system that performs the method steps, in any order, is within the scope of the invention. Furthermore, although the method steps describe the actions of a single executing thread group (that includes K threads) within a CTA, persons skilled in the art will understand that multiple, unique instances of the thread group may be executing in multiple independent CTAs.

The method uses a well-known system variable, referred to as "threadIdx.x," to identify which thread number is executing a particular instance of the method. Persons skilled in the art will recognize that certain mask operations may be applied to the value of threadIdx.x to extract a thread subID value suitable for specific computations within a thread group.

The method begins in step 610, which may involve a thread synchronization operation, as required, to align the execution of multiple parallel instances of threads performing the method. As described in FIG. 5A, each thread has an associated sort key, and each sort key may be divided into sub-keys.

In step 612-0, if the thread subID is equal to zero, then the method proceeds to step 614-0, where a selected radix symbol occurrence counter is incremented. The radix symbol occurrence counter is selected based on the radix value of a current sub-key of the sort key associated with the thread subID. For example, if each sub-key is 8 bits, then there are 256 radix symbol occurrence counters associated with each thread group. The value of the 8-bit sub-key determines which one of the 256 counters should be incremented by one. If, in step 612-0, the thread subID is not equal to zero, then the method proceeds to step 612-1.

In step 612-1, if the thread subID is equal to one, then the method proceeds to step 614-1, where a selected radix symbol occurrence counter is incremented. The radix symbol occurrence counter is selected based on the radix value of a current sub-key of the sort key associated with the thread subID. If, in step 612-1, the thread subID is not equal to one, then the method proceeds to additional pairs of steps identical in structure to steps 612 and 614, until reaching step 612-G.

If, in step 612-K, the thread subID is equal to K−1, then the method proceeds to step 614-K, where a selected radix symbol occurrence counter is incremented. The radix symbol occurrence counter is selected based on the radix value of a current sub-key of the sort key associated with the thread subID. If, in step 612-K, the thread subID is not equal to K−1, the method proceeds to step 616. The method terminates in step 616.

Figure 6B:
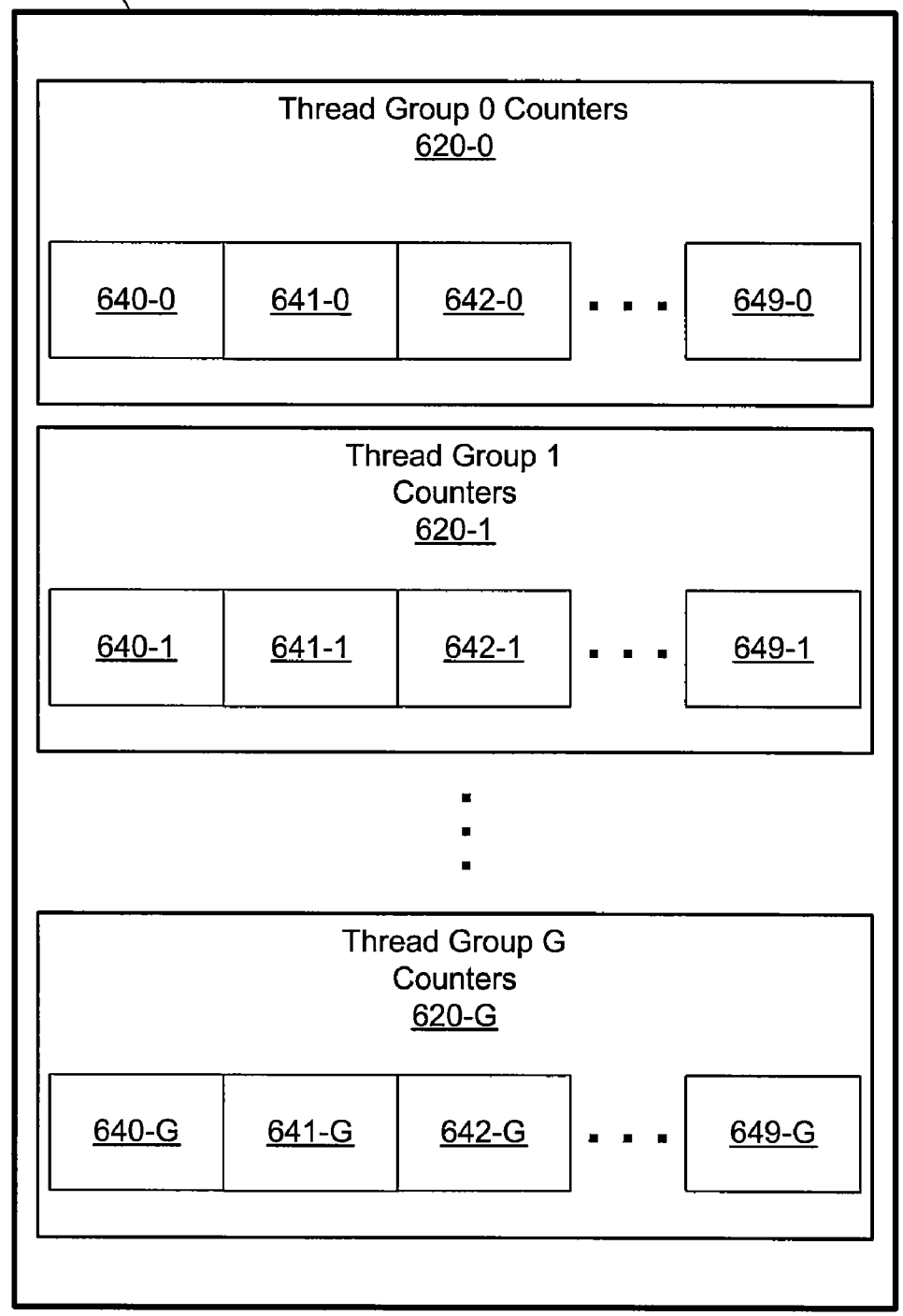
FIG. 6B illustrates a memory map of radix symbol occurrence counters within CTA shared memory, according to one embodiment of the invention.

FIG. 6B illustrates a memory map of radix symbol occurrence counters within CTA shared memory 622, according to one embodiment of the invention. Thread group counters 620 include individual radix symbol occurrence counters 640 through 649, corresponding to occurrence counts of each radix symbol encountered by a given thread group during the method described in FIG. 6A. For example, if the threads in thread group 0 have encountered exactly three instances of radix symbol "0" within their associated segment, then the radix symbol occurrence counter 640-0 stores the value three. Similarly, if the threads in thread group 1 have encountered no instances of radix symbol "0" within their associated segment, then the radix symbol occurrence counter 640-1 stores the value zero.

Figure 6C:
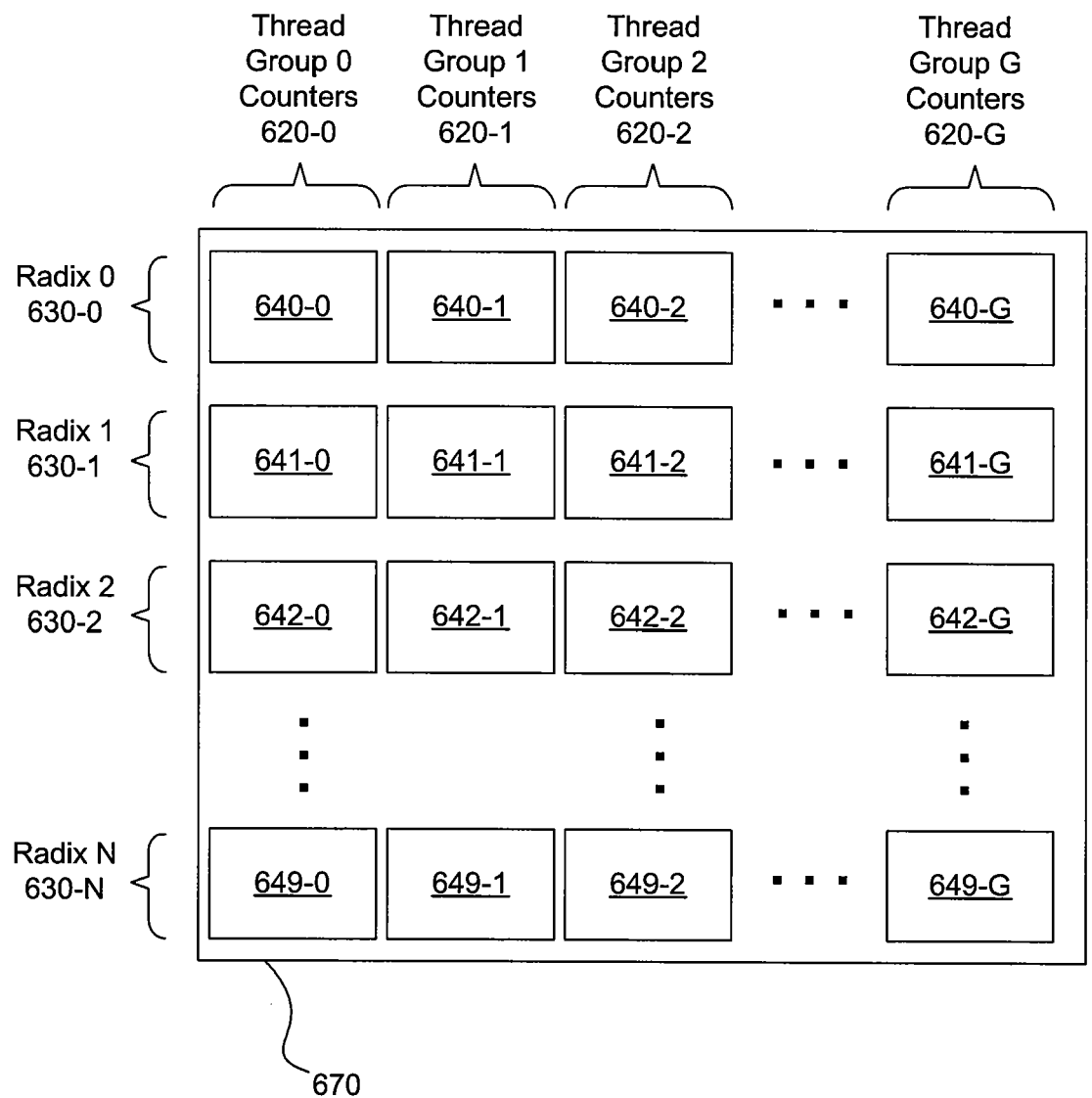
FIG. 6C illustrates an array of radix symbol occurrence counters, according to one embodiment of the invention.

FIG. 6C illustrates an array of radix symbol occurrence counters 670, according to one embodiment of the invention. The array of radix symbol occurrence counters 670 includes the radix symbol occurrence counters 640 through 649 from FIG. 6B and, for each thread group, computed using the method of FIG. 6A. The array of radix symbol occurrence counters 670 is organized first by radix symbol 630 and second by thread group 620 and includes the results of all participating thread groups 550.

Figure 7A:
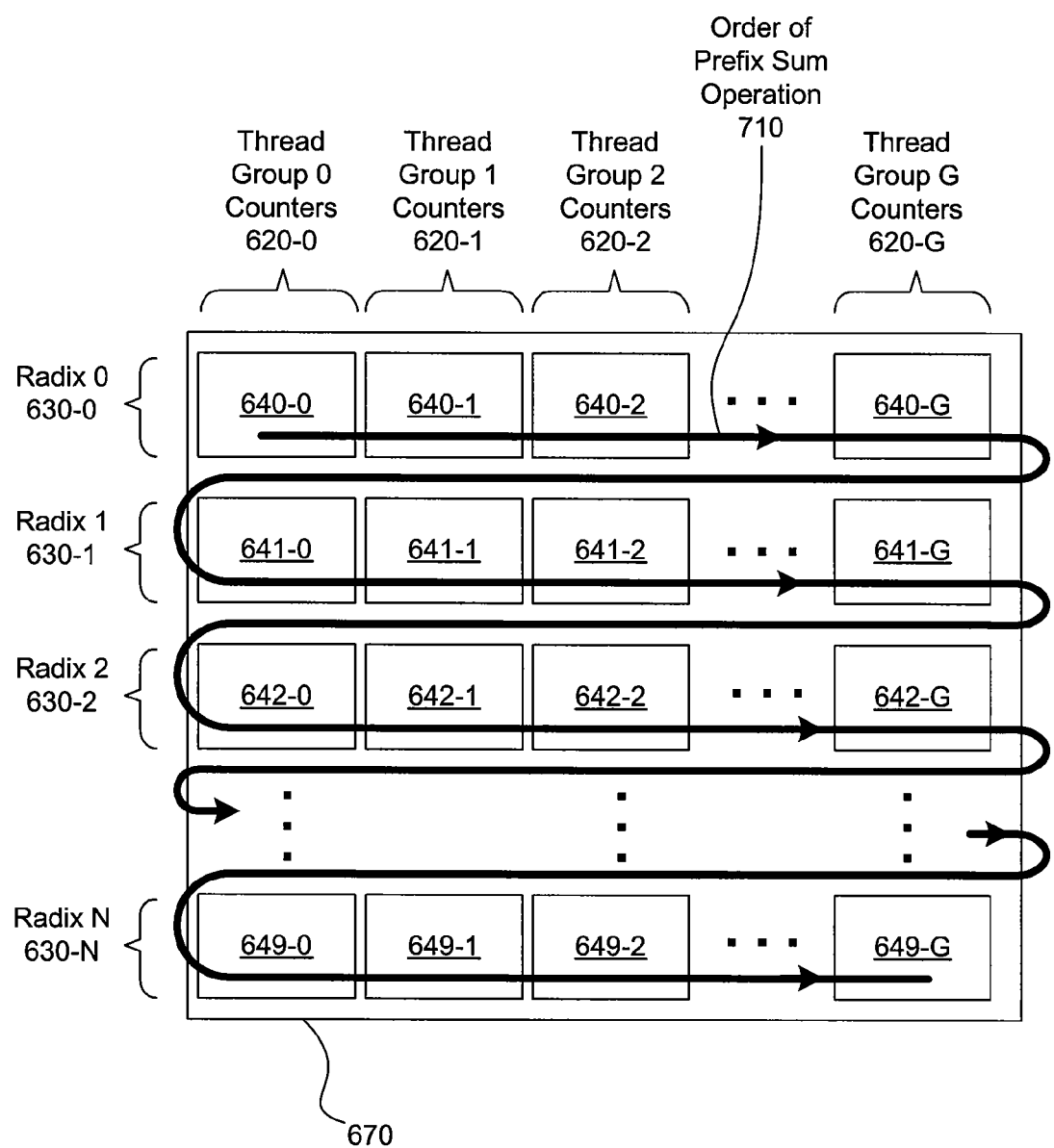
FIG. 7A illustrates a prefix sum operation performed over the array of radix symbol occurrence counters, according to one embodiment of the invention.

FIG. 7A illustrates a prefix sum operation performed over the array of radix symbol occurrence counters 670 of FIG. 6, according to one embodiment of the invention. The order of prefix sum operation 710 is first by radix 630 and second by thread group 620. The prefix sum operation may be performed using any technically feasible technique. One such technique is described in the patent application titled, "A Work-Efficient Parallel Prefix Sum Algorithm for Graphics Processing Units," filed on Aug. 8, 2007 and having U.S. patent application Ser. No. 11/836,027.

The prefix sum operation over the array of radix symbol occurrence counters 670 produces an array of prefix sum offsets, ordered first by radix and second by thread group. Because the prefix sum is computed over all thread groups and all related input sort keys, the prefix sum offsets for a given thread group over the associated radix symbols correspond to the sorted output base location of each input sub-key for that thread group. Data, such as data 422 in FIG. 4A, corresponding to a sort key, may be reordered along with the sort key to produce a sorted output that includes both sort keys and associated data. In one embodiment, the array of radix symbol occurrence counters 670 is overwritten with the corresponding array of prefix sum offsets. The first element of the array of prefix sum offsets is typically set to zero.

Figure 7B:
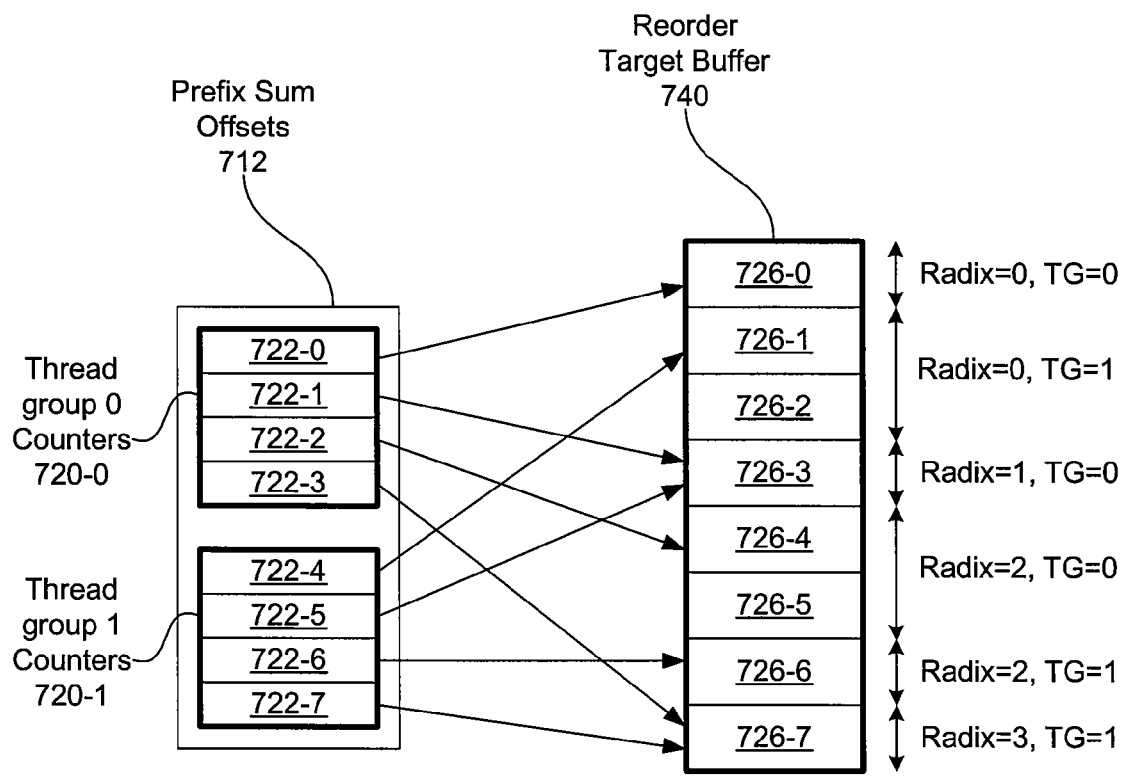
FIG. 7B illustrates a property of prefix sum offsets for reordering data, in accordance with one or more aspects of the present invention.

FIG. 7B illustrates a property of prefix sum offsets 712 for reordering data, in accordance with one or more aspects of the present invention. As shown in this example, the prefix sum offsets 712 include an array of eight elements 722. Elements 722-0 through 722-3 are computed from thread group 0 radix symbol occurrence counters 620-0, and elements 722-4 through 722-7 were computed from thread group 1 radix symbol occurrence counters 620-1. For purposes of discussion, suppose thread group 0 counted one instance of radix symbol 0, one instance of radix symbol 1, two instances of radix symbol 2, and zero instances of radix symbols 3. The occurrence count for thread group 0 would form an ordered list given by: {1, 1, 2, 0}. Suppose further that thread group 1 counted two instances of radix symbol 0, zero instances of radix symbol 1, one instance of radix symbol 2, and one instance of radix symbol 3. The occurrence count for thread group 1 would form an ordered list given by: {2, 0, 1, 1}. Combining the occurrence counts for thread groups 0 and 1 would form an ordered overall occurrence list given by: {1, 2, 1, 0, 2, 1, 0, 1}. Performing a prefix sum operation on this overall occurrence list would produce a prefix sum output list given by {1, 3, 4, 4, 6, 7, 7, 8}. The prefix sum output list may be modified to correspond to a set of offset locations. In one embodiment, the list of prefix sum offsets may be formed by stuffing the first offset list element with a zero and eliminating the last prefix sum output list element. Thus, the prefix sum output list given by {1, 3, 4, 4, 6, 7, 7, 8} would correspond to a set or list of prefix sum offsets given by {0, 1, 3, 4, 4, 6, 7, 7}. The prefix sum offsets are associated with starting locations in a reorder target buffer 740 such that radix symbols are sequentially clustered together in the reorder target buffer 740. Referring back to FIG. 7B, thread group 0 uses a subset of the prefix sum offsets associated with thread group 0. This subset is given by {0, 3, 4, 7}. Similarly, thread group 1 uses a list of associated offsets given by {1, 4, 6, 7}. The occurrence list, the prefix sum output list, and the prefix sum offset list may share storage locations 722.

As also shown, two different prefix sum offsets point to the same location within the reorder target buffer 740. One of the two prefix sum offsets corresponds to a thread group that counted zero instances of the corresponding radix symbol. The other thread group counted one instance of the corresponding radix symbol. For example, if thread group 0 counted one instance of radix symbol 1, and thread group 1 counted zero instances of radix symbol 1, then both 722-1 and 722-5 point to the same location within the reorder target buffer 740 because during the prefix sum operation, element 722-5 contributed a zero to the overall offset for radix symbol 1. In this scenario, only thread group 0 should use an offset related to radix 1.

Figure 8A:
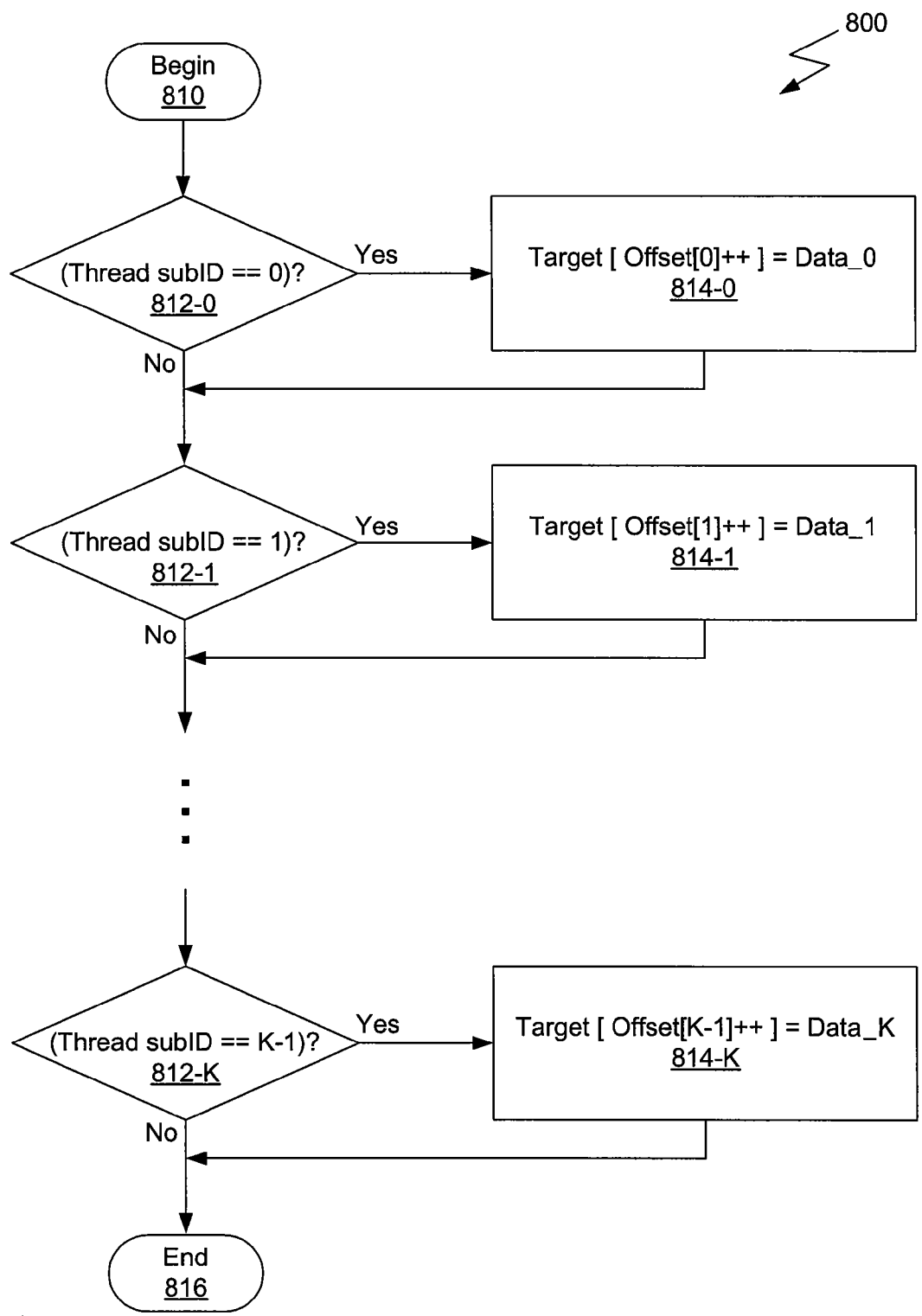
FIG. 8A is a flow diagram of method steps for reordering data using a thread group, according to one embodiment of the invention.

FIG. 8A is a flow diagram of method steps for reordering data using a thread group, according to one embodiment of the invention. Although the method steps are described in conjunction with the systems of FIGS. 1, 2 and 3, persons skilled in the art will understand that any system that performs the method steps, in any order, is within the scope of the invention. Furthermore, although the method steps describe the actions of a single executing thread group (that includes K threads) within a CTA, persons skilled in the art will understand that multiple, unique instances of the thread group may be executing in multiple independent CTAs.

The method uses a well-known system variable, referred to as "threadIdx.x," to identify which thread number is executing a particular instance of the method. Persons skilled in the art will recognize that certain mask operations may be applied to the value of threadIdx.x to extract a thread subID value suitable for specific computations within a thread group.

The method begins in step 810, which may involve a thread synchronization operation, as required, to align the execution of more than one parallel instances of threads performing the method.

If, in step 812-0, the thread subID is equal to zero, then the method proceeds to step 814-0, where a target location at offset [0] within a reorder target buffer is written with data_0, associated with thread zero. The content of data_0 includes a sort key and may include any data associated with the sort key. The offset [0] value is established by reading an offset value within the array of prefix sum offsets of FIG. 7A that corresponds to the current thread group and radix symbol associated with data_0. The offset [0] value is post incremented upon access. This post increment operation establishes a new offset value for potential reordering operations involving the same sort key radix value within the thread group. The radix symbol may be a sort key or sub-key. If, in step 812-0, the thread subID is not equal to zero, the method proceeds to step 812-1.

In step 812-1, if the thread subID is equal to one, then the method proceeds to step 814-1, where a target location at offset [1] within a reorder target buffer is written with data_1 associated with thread one. The content of data_1 includes a sort key and may include any data associated with the sort key. The offset [1] value is established by reading an offset value within the array of prefix sum offsets of FIG. 7A that corresponds to the current thread group and radix symbol associated with data_1. The offset [1] value is post-incremented upon access. The radix symbol may be a sort key or sub-key. If, in step 812-1, the thread subID is not equal to one, then the method proceeds to additional pairs of steps identical in structure to steps 812 and 814 until reaching step 812-G.

If, in step 812-K, the thread subID is equal to K−1, then the method proceeds to step 814-K, where a target location at offset [K−1] within a reorder target buffer is written with data_K, associated with thread K−1. The content of data_K includes a sort key and may include any data associated with the sort key. The offset [K−1] value is established by reading an offset value within the array of prefix sum offsets of FIG. 7A that corresponds to the current thread group and radix symbol associated with data_K. The offset [K−1] value is post incremented upon access. The radix symbol may be a sort key or sub-key. If, in step 812-1, the thread subID is not equal to K−1, the method proceeds to step 816. The method terminates in step 816.

Figure 8B:
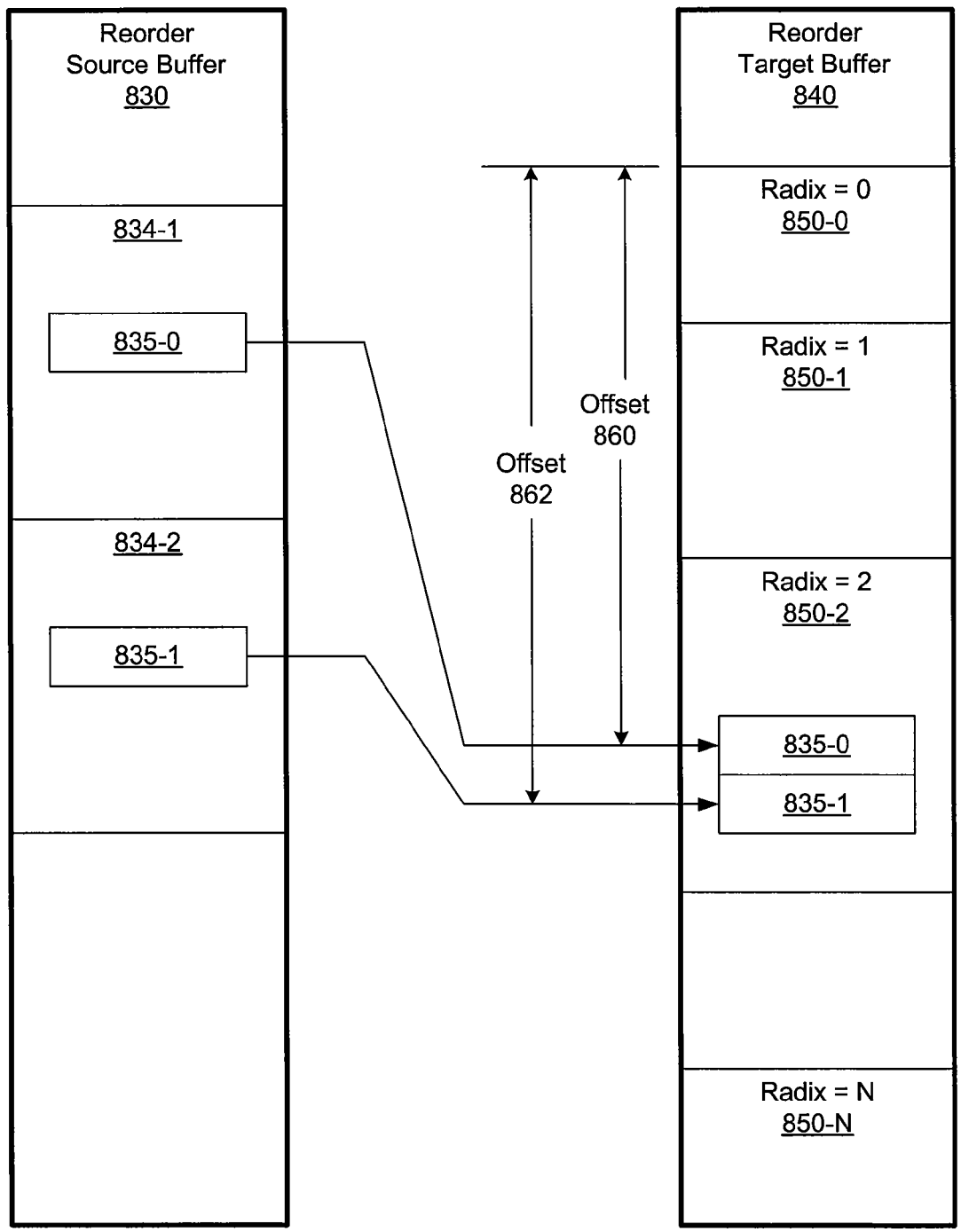
FIG. 8B illustrates the use of offsets in reordering operations, according to one embodiment of the invention.

FIG. 8B illustrates the use of offsets 860, 862 in reordering operations, according to one embodiment of the invention. A reorder source buffer 830 is organized by segments 834, which include data associated with various thread groups. Each segment 834 may include one or more entries 835. Each entry 835 includes a sort key and may include data associated with the sort key. A reorder target buffer 840 may be organized by radix symbol, where each radix symbol has an associated radix target buffer 850 used to store reordered entries from the reorder source buffer 830. The size of each radix target buffer 850 is determined by the prevalence of specific radix symbols in the reorder source buffer 830.

After the prefix sum operation of FIG. 7A, each radix symbol associated with each segment 834 contributes an incremental offset in the overall prefix sum result stored within the array of prefix sum offsets. For each thread group, the array of prefix sum offsets includes the base location each radix symbol relative to the specific thread group. For example, if segment 834-1 is associated with thread group 1, then offset 860 is associated with both thread group 1 and radix 2 within the array of prefix sum offsets 712. Similarly, if segment 834-2 is associated with thread group 2, then offset 862 is associated with both thread group 2 and radix 2 within the array of prefix sum offsets 112. Thread group 1 and thread group 2 each independently writes entries 835-0 and 835-1, respectively, to the reorder target buffer 840. As a result of the independent reorder operations entries 835-0 and 835-1 are properly reordered within the reorder target buffer 840.

In one embodiment, the underlying buffers allocated to the reorder source buffer 830 and the reorder target bugger 840 are swapped after each pass. Initially, the reorder source buffer 830 stores the input data. After a first pass, the reorder target buffer 840 becomes the new reorder source buffer and the previous reorder source buffer 830 becomes the new reorder target buffer. Similarly, the buffers swap after each subsequent pass.

Figure 9:
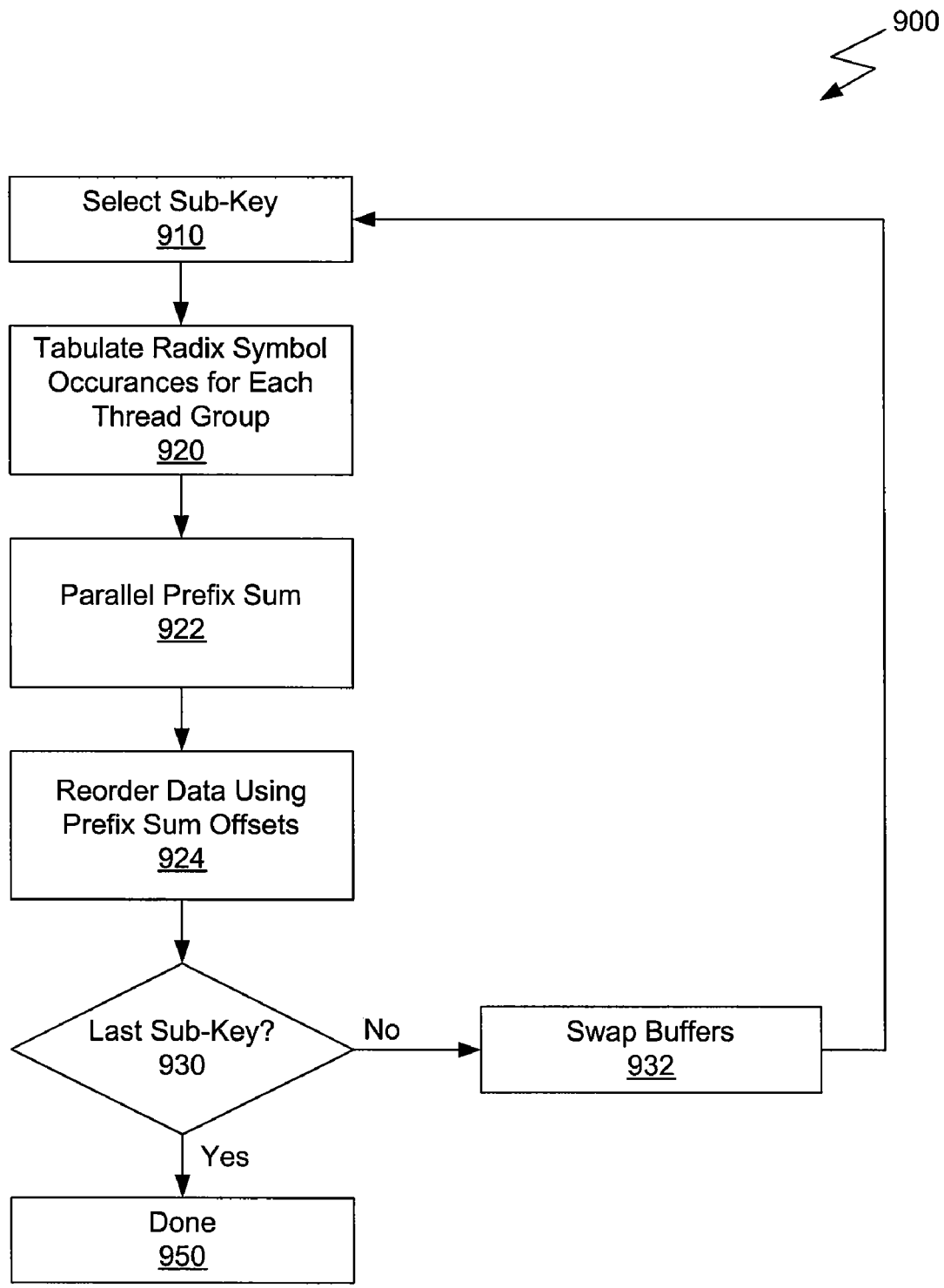
FIG. 9 is a flow diagram of method steps for sorting data, according to one embodiment of the invention.

FIG. 9 is a flow diagram of method steps for sorting data, according to one embodiment of the invention. Although the method steps are described in conjunction with the systems of FIGS. 1, 2 and 3, persons skilled in the art will understand that any system that performs the method steps, in any order, is within the scope of the invention. Furthermore, although the method steps describe the actions of a single executing thread within a CTA, persons skilled in the art will understand that multiple, unique instances of the thread may be concurrently executing in multiple independent CTAs.

The method begins in step 910, where a sub-key range is selected from a total sort key. For example, the lower 8 bits of a 32-bit number may be selected in a first pass, and 8 higher bits of a 32-bit number may be selected in a second pass.

In step 920, the radix symbol occurrences are tabulated for each thread group, as described in FIGS. 6A-C. The result is an array of radix symbol occurrence counters organized by radix and thread group. In step 922, a parallel prefix sum is performed over the array of radix symbol occurrence counters, as described in FIG. 7A. The result is an array of prefix sum offsets. In step 924, the array of prefix sum offsets are used to reorder data from a reorder source buffer to a reorder target buffer, as described in FIGS. 8A-B.

In step 930, if the last sub-key has not been processed, the method proceeds to step 932, when source and target buffers are swapped. The method then proceeds back to step 910. If, in step 930, the last sub-key has been processed, the method terminates in step 950.

In sum, a technique is disclosed for performing a sort on data using parallel thread groups within a parallel processing subsystem. The technique performs the sort in one or more passes of three phases each. Fixed-length sort key inputs are divided into sub-keys, which are used for sorting operations for the duration of a pass, starting with the least significant sub-keys and moving to more significant sub-keys in successive passes. In each phase, a thread group is associated with a segment of input data. In the first phase, each thread group counts radix symbol occurrence within the associated segment and saves the count values in an array of radix symbol occurrence counters. In the second phase, the thread groups perform a parallel prefix sum over the array of radix symbol occurrence counters. The resulting prefix sum offsets are used in the third phase, where the input data is reordered using the radix symbol occurrence counters. Performing the three phases effectively sorts the input data, based on the selected sub-keys. Performing enough passes over the input data to incorporate each sub-key effectively sorts the input data.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A method for reordering data, the method comprising:
   generating an ordered list of radix occurrences based on radix symbol and thread group number;
   performing a prefix sum operation across the radix occurrences to produce a prefix sum output list;
   modifying the prefix sum output list to produce an ordered list of offsets;
   selecting a first sub-key for each thread in a first thread group, wherein each thread corresponds to a different sort key in a first set of sort keys, and each sort key comprises an identical number of sub-keys;
   determining a value of the first sub-key for each thread in the first thread group;
   determining a first offset associated with the first sub-key value determined for each thread in the first thread group; and
   storing data associated with the sort key corresponding to each thread in the first thread group at a buffer location based on the first offset determined for the thread.

2. The method of claim 1, wherein the ordered list of radix occurrences comprises an array organized by radix symbol and thread group number.

3. The method of claim 1, further comprising the steps of:
selecting a second sub-key for each thread in the first thread group;
determining a value of the second sub-key for each thread in the first thread group;
determining a second offset associated with the second sub-key value determined for each thread in the first thread group; and
storing the data associated with the sort key corresponding to each thread in the first thread group at a buffer location based on the second offset determined for the thread.

4. The method of claim 1, wherein the steps of determining a value of a sub-key, determine an offset associated with the sub-key value determined for each thread in the first thread group, and storing the data associated with the sort key corresponding to each thread in the first group at a buffer location based on the offset determined for the thread are repeated for each of the sub-keys comprising the sort keys.

5. The method of claim 1, further comprising the steps of:
selecting a first sub-key for each thread in a second thread group, wherein each thread corresponds to a different sort key in a second set of sort keys, and each sort key comprises the identical number of sub-keys;
determining a value of the first sub-key for each thread in the second thread group;
determining a second offset associated with the first sub-key value determined for each thread in the second thread group; and
storing data associated with the sort key corresponding to each thread in the second thread group at a buffer location based on the second offset determined for the thread.

6. The method of claim 5, wherein the first thread group and the second thread group are part of a cooperative thread array.

7. The method of claim 6, wherein the cooperative thread array executes within a core of a parallel processing unit.

8. The method of claim 7, wherein the parallel processing unit comprises a graphics processing unit.

9. The method of claim 1, wherein each of the threads in the first thread group executes within a different processing engine within a core of a parallel processing unit.

10. A computer-readable medium including instructions that, when executed by a processing unit, cause the processing unit to reorder data, by performing the steps of:
generating an ordered list of radix occurrences based on radix symbol and thread group number;
performing a prefix sum operation across the radix occurrences to produce a prefix sum output list;
modifying the prefix sum output list to produce an ordered list of offsets;
selecting a first sub-key for each thread in a first thread group, wherein each thread corresponds to a different sort key in a first set of sort keys, and each sort key comprises an identical number of sub-keys;
determining a value of the first sub-key for each thread in the first thread group;
determining a first offset associated with the first sub-key value determined for each thread in the first thread group; and
storing data associated with the sort key corresponding to each thread in the first thread group at a buffer location based on the first offset determined for the thread.

11. The computer-readable medium of claim 10, wherein the ordered list of radix occurrences comprises an array organized by radix symbol and thread group number.

12. The computer-readable medium of claim 10, further comprising the steps of:
selecting a second sub-key for each thread in the first thread group;
determining a value of the second sub-key for each thread in the first thread group;
determining a second offset associated with the second sub-key value determined for each thread in the first thread group; and
storing the data associated with the sort key corresponding to each thread in the first thread group at a buffer location based on the second offset determined for the thread.

13. The computer-readable medium of claim 10, wherein the steps of determining a value of a sub-key, determine an offset associated with the sub-key value determined for each thread in the first thread group, and storing the data associated with the sort key corresponding to each thread in the first group at a buffer location based on the offset determined for the thread are repeated for each of the sub-keys comprising the sort keys.

14. The computer-readable medium of claim 10, further comprising the steps of:
selecting a first sub-key for each thread in a second thread group, wherein each thread corresponds to a different sort key in a second set of sort keys, and each sort key comprises the identical number of sub-keys;
determining a value of the first sub-key for each thread in the second thread group;
determining a second offset associated with the first sub-key value determined for each thread in the second thread group; and
storing data associated with the sort key corresponding to each thread in the second thread group at a buffer location based on the second offset determined for the thread.

15. The computer-readable medium of claim 14, wherein the first thread group and the second thread group are part of a cooperative thread array.

16. The computer-readable medium of claim 15, wherein the cooperative thread array executes within a core of a parallel processing unit.

17. The computer-readable medium of claim 10, wherein each of the threads in the first thread group executes within a different processing engine within a core of a parallel processing unit.

18. A computing device, comprising:
a memory; and
a parallel processing unit configured to support the execution of a plurality of thread groups such that:
an ordered list of radix occurrences is generated based on radix symbol and thread group number,
a prefix sum operation is performed across the radix occurrences to produce a prefix sum output list,
the prefix sum output list is modified to produce an ordered list of offsets;
a first sub-key is selected for each thread in a first thread group, wherein each thread corresponds to a different sort key in a first set of sort keys, and each sort key comprises an identical number of sub-keys,
a value of the first sub-key is determined for each thread in the first thread group, a first offset associated with the first sub-key value determined for each thread in the first thread group is determined, and data associated with the sort key corresponding to each thread in the first thread group is stored at a buffer location based on the first offset determined for the thread.

19. The computing device of claim 18, wherein each of the threads in the first thread group executes within a different processing engine within a core of the parallel processing unit.

20. The computing device of claim 19, wherein the parallel processing unit comprises a graphics processing unit.

* * * * *